(12) United States Patent
Kurokawa

(10) Patent No.: US 8,416,558 B2
(45) Date of Patent: Apr. 9, 2013

(54) SOLID ELECTROLYTIC CAPACITOR AND METHOD FOR MANUFACTURING SAME

(75) Inventor: Akinari Kurokawa, Osaka (JP)

(73) Assignee: SANYO Electric Co., Ltd., Moriguchi-shi, Osaka (JP)

( * ) Notice: Subject to any disclaimer, the term of this patent is extended or adjusted under 35 U.S.C. 154(b) by 254 days.

(21) Appl. No.: 12/404,411

(22) Filed: Mar. 16, 2009

(65) Prior Publication Data

US 2009/0237867 A1  Sep. 24, 2009

(30) Foreign Application Priority Data

Mar. 18, 2008  (JP) ................ 2008-068633

(51) Int. Cl.
  *H01G 4/228* (2006.01)
  *H01G 9/00* (2006.01)
(52) U.S. Cl. .................................... 361/540
(58) Field of Classification Search .......... 361/540, 361/538, 531, 528; 29/25.03
  See application file for complete search history.

(56) References Cited

U.S. PATENT DOCUMENTS

| | | | | |
|---|---|---|---|---|
| 6,728,097 | B2 * | 4/2004 | Wada et al. ............ | 361/533 |
| 6,995,972 | B2 | 2/2006 | Fujii et al. | |
| 7,161,796 | B2 * | 1/2007 | Deisenhofer et al. ......... | 361/540 |
| 7,161,797 | B2 * | 1/2007 | Vaisman et al. ............. | 361/540 |
| 7,277,271 | B2 * | 10/2007 | Yamaguchi et al. .......... | 361/523 |
| 2007/0279841 | A1 * | 12/2007 | Kim et al. ................. | 361/540 |

FOREIGN PATENT DOCUMENTS

| | | |
|---|---|---|
| CN | 1649052 A | 8/2005 |
| DE | 3931249 A1 * | 3/1991 |
| JP | 52-36244 U | 3/1977 |
| JP | 58-008941 U1 | 1/1983 |
| JP | 4-004733 U | 1/1992 |
| JP | 05275288 A * | 10/1993 |
| JP | 05283300 A * | 10/1993 |
| JP | 05315201 A * | 11/1993 |
| JP | 2000-323357 A | 11/2000 |
| JP | 2001-267181 A | 9/2001 |
| JP | 2002-367862 A | 12/2002 |

OTHER PUBLICATIONS

Chinese Office Action dated Aug. 31, 2011, issued in corresponding Chinese Patent Application No. 200910126834.6.
Chinese Office Action dated Dec. 19, 2011, issued in corresponding Chinese Patent Application No. 200910126834.6.
Japanese Office Action dated Jun. 5, 2012, issued in corresponding Japanese Patent Application No. 2008-068633, (7 pages). With English Translation.

* cited by examiner

*Primary Examiner* — Eric Thomas
(74) *Attorney, Agent, or Firm* — Westerman, Hattori, Daniels & Adrian, LLP

(57) ABSTRACT

A solid electrolytic capacitor according to the present invention comprises a capacitor element including an anode lead-out part and a cathode lead-out part, an anode lead frame connected to the anode lead-out part via a conductive member, and a cathode lead frame connected to the cathode lead-out part, and the anode lead frame is connected to the anode lead-out part via an anode side assistance frame in addition to said conductive member.

3 Claims, 12 Drawing Sheets

SOLID ELECTROLYTIC CAPACITOR AND METHOD FOR MANUFACTURING SAME

The priority application Number 2008-068633 upon which this patent application is based, is hereby incorporated by reference.

BACKGROUND OF THE INVENTION

1. Field of the Invention

The present invention relates to a solid electrolytic capacitor having an anode lead frame and cathode lead frame with their lower end surfaces exposed from the end surface of the exterior resin.

2. Description of Related Art

Conventionally, capacitors have been widely used in electronic circuits. Among the capacitors, electrolytic capacitors are relatively small and have large-capacity, and therefore, they have been often used in electrical power circuits and the like. As an example, such electrolytic capacitors include a solid electrolytic capacitor having the structure shown in FIG. 17. This solid electrolytic capacitor has a capacitor element having an anode lead-out part 121 and a cathode lead-out part 15. The anode lead-out part 121 and an anode lead frame 161 are connected to each other, while the cathode lead-out part 15 and a cathode lead frame 162 are connected to each other. The solid electrolytic capacitor shown in FIG. 17 has the structure in which parts of the anode lead frame 161 and cathode lead frame 162 and the capacitor element are covered by an exterior resin 19, while exposed parts of the anode lead frame 161 and cathode lead frame 162 from the exterior resin 19 are bent along the peripheral surface of the exterior resin 19.

In forming the solid electrolytic capacitor having the structure described above, when the anode lead frame 161 and the cathode lead frame 162 are bent along the exterior resin 19 as described above, a significant bending stress is applied. Therefore, the exterior resin 19 has to be thick to ensure the strength that can endure the bending stress. However, the thick exterior resin 19 increases the size of the capacitor, and therefore is not preferable. Further, recently there is a growing need for high capacity capacitors and it is required to increase the volume occupied by the capacitor element in the capacitor. To meet such requirements, a solid electrolytic capacitor having the structure shown in FIG. 18 has been proposed and used (see for example Japanese published unexamined patent application No. 2002-367862).

The solid electrolytic capacitor shown in FIG. 18 comprises the flat plate-like anode lead frame 161 and cathode lead frame 162, the lower end surfaces of which are exposed from the exterior resin 19. In such a solid electrolytic capacitor, in the case where the lead wire shown in FIG. 18 is used as the anode lead-out part 121, the anode lead-out part 121 and the cathode lead-out part 15 are not located on the same horizontal level. Therefore, when a conductive member 18 is mounted on the anode lead frame 161 and the anode lead-out part 121 is mounted on the conductive member 18, care should be taken for the capacitor element to be disposed horizontally. However, the thickness of each layer forming a capacitor element varies between individual layers. When such a capacitor element is connected to the anode lead frame 161 and the cathode lead frame 162 so that the cathode lead-out part 15 and the cathode lead frame 162 come into surface contact with each other for strong connection, the anode lead-out part 121 is separated from the conductive member 18 to fail in the reliable connection, leading to the problem of increase in ESR (Equivalent Series Resistance) of the capacitor or generation of defective units. Also, when it is attempted to firmly connect the conductive member 18 and the anode lead-out part 121, the cathode lead-out part 15 is not reliably connected to the cathode lead frame 162, thereby having problems of increase in the ESR and generation of defective units.

SUMMARY OF THE INVENTION

In view of the above mentioned problems, a solid electrolytic capacitor according to the present invention comprises a capacitor element including an anode lead-out part and a cathode lead-out part, an anode lead frame connected to the anode lead-out part via a conductive member, and a cathode lead frame connected to the cathode lead-out part, and the anode lead frame is connected to the anode lead-out part via an anode side assistance frame in addition to said conductive member.

A solid electrolytic capacitor according to another configuration of the present invention comprises a capacitor element including an anode lead-out part and a cathode lead-out part, an anode lead frame connected to the anode lead-out part, a cathode lead frame connected to the cathode lead-out part, and an anode side assistance frame connected to the anode lead-out part and the anode lead frame. The anode side assistance frame has a step part, and one of both sides across the step part is connected to the anode lead-out part while the other is connected to the anode lead frame. The step part can be formed either in the direction in which the anode lead-out part and the cathode lead-out part are arrayed, or in the direction generally perpendicular to the direction in which the anode lead-out part and the cathode lead-out part are arrayed.

For the solid electrolytic capacitor of the present invention, it is preferable to include a cathode side assistance frame connected to the cathode lead-out part and cathode lead frame, and the cathode lead-out part and the cathode side assistance frame are connected to each other on a face opposed to a face on which the cathode lead-out part and the cathode lead frame are connected to each other, while the cathode lead frame and the cathode side assistance frame are connected to each other on the face on which the cathode lead-out part and the cathode lead frame are connected to each other.

Also, a method for manufacturing a solid electrolytic capacitor according to the present invention comprises a first step of forming a capacitor element including an anode lead-out part and a cathode lead-out part, a second step of mounting the capacitor element on an assistance frame including an anode side assistance frame and a cathode side assistance frame, and a third step of mounting the capacitor element on a lead frame including an anode lead frame and a cathode lead frame after performing the second step.

According to the structure and manufacturing method of the solid electrolytic capacitor of the present invention, even when the thickness of the capacitor element varies, the anode lead-out part and anode lead frame as well as the cathode lead-out part and cathode lead frame are reliably connected to each other respectively, thereby contributing to the improvement of the yield rate. Also, the connections between the anode lead-out part and anode lead frame and between the cathode lead-out part and cathode lead frame are strong, thereby reducing the ESR of the solid electrolytic capacitor.

DETAILED DESCRIPTION OF THE PREFERRED EMBODIMENT

Preferred embodiments of the present invention are discussed in detail below with reference to drawings.

Embodiment 1

Figure 1A:
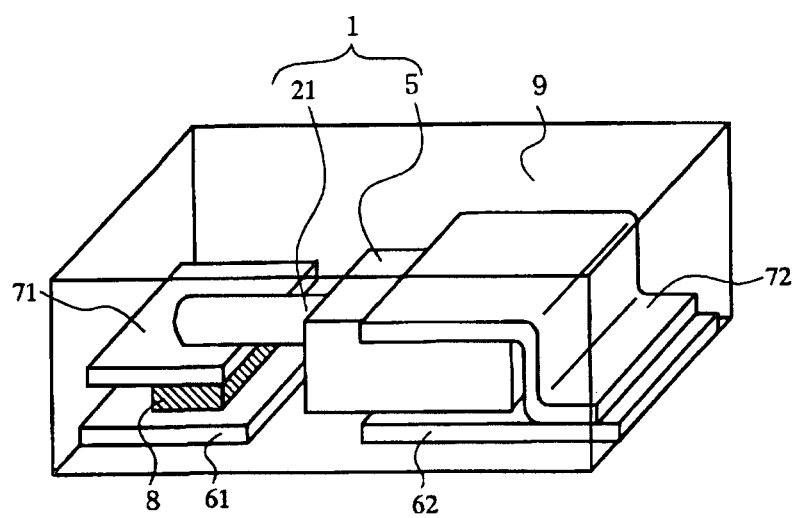
FIG. 1A is a perspective view of a solid electrolytic capacitor of the first embodiment of the present invention.
Figure 1B:
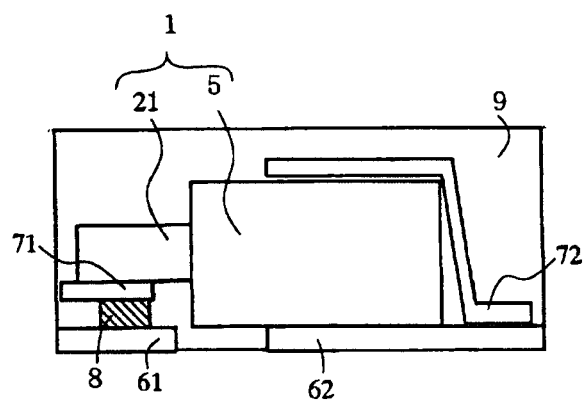
FIG. 1B is a cross-sectional view of the solid electrolytic capacitor of the first embodiment of the present invention.
Figure 4:
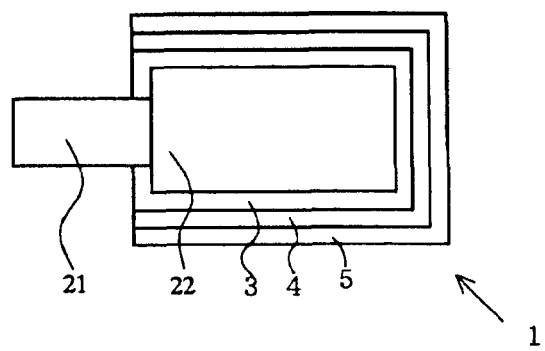
FIG. 4 is a cross-sectional view of a capacitor element of the present invention.

FIGS. 1A and 1B are a perspective view and a cross-sectional view showing the structure of a solid electrolytic capacitor of the first embodiment of the present invention respectively. This solid electrolytic capacitor comprises a capacitor element 1 including an anode lead-out part 21 and a cathode lead-out part 5, an anode lead frame 61 and cathode lead frame 62, an anode side assistance frame 71 and cathode side assistance frame 72, a conductive member 8, and an exterior resin 9. Here, the capacitor element 1 has a structure shown in FIG. 4, wherein the capacitor element 1 is formed by forming a dielectric layer 3 on the peripheral surface of an anode body 22 having the anode lead-out part 21 planted therein, and then forming a cathode layer 4 on the dielectric layer 3 as well as the cathode lead-out part 5 on the cathode layer 4.

Lower end surfaces of the anode lead frame 61 and cathode lead frame 62 are exposed from the lower end surface of the exterior resin 9, and the anode lead frame 61 is connected to the anode lead-out part 21 via the conductive member 8 and the anode side assistance frame 71, while the cathode lead frame 62 is connected to the cathode lead-out part 5. The cathode lead frame 62 is connected to a cathode side assistance frame 72 on the face thereof on which the cathode lead frame 62 is connected to the cathode lead-out part 5. The anode side assistance frame 71 has a flat plate-like shape while the cathode side assistance frame 72 has a step part. The cathode lead-out part 5 is connected to the cathode side assistance frame 72 on a face of the cathode lead-out part 5 opposed to a face on which the cathode lead-out part 5 is connected to the cathode lead frame 62. Due to such a structure, the cathode side assistance frame 72 and the cathode lead-out part 5 are reliably connected to each other, and the cathode side assistance frame 72 is connected to the cathode lead frame 62. Therefore, by arranging the anode lead-out part 21 and the anode side assistance frame 71 so as to be reliably connected to each other, the capacitor element 1 is reliably connected to the anode lead frame 61 and cathode lead frame 62, thereby decreasing generation of defective units to improve the yield rate. Also, the capacitor element 1 is electrically connected to the anode lead frame 61, the cathode lead frame 62, the anode side assistance frame 71, and the cathode side assistance frame 72, and therefore, the connection area increases to thereby reduce the ESR of the solid electrolytic capacitor.

Below is the description of the manufacturing method of the solid electrolytic capacitor of the first embodiment.

First, the capacitor element 1 is formed. The capacitor element 1 has a structure shown in FIG. 4 as described above, and can be manufactured by using known materials and techniques. In particular, the capacitor element 1 is formed, for example, as to be described below. A sintered body made of a valve action metal such as aluminum, tantalum, and niobium having an anode wire made of a valve action metal such as aluminum, tantalum, and niobium planted therein is formed to be used as the anode body 22. Also, the anode wire is used as the anode lead-out part 21. And then, the anode body 22 is subjected to a chemical conversion treatment using an acid solution to form the dielectric layer 3 on the peripheral surface of the anode body 22, and subsequently the cathode layer 4 is formed on the peripheral surface of the dielectric layer 3. The cathode layer 4 particularly is formed from a solid electrolyte and maybe either formed in a single layer structure or formed from a plurality of layers. For the solid electrolyte, it is possible to adopt an inorganic semiconductor such as manganese dioxides, an organic semiconductor such as TCNQ (7,7,8,8-tetracyano quinodimethane) complex salt, a conductive polymer such as polypyrrole, polythiophene, polyfuran, and the polyaniline, that can be formed by known methods. The cathode lead-out part 5 is formed on the peripheral surface of this cathode layer 4 to form the capacitor element 1. Here, the cathode lead-out part 5 can have a one layer structure with silver paste or a laminated structure with conductive paste and silver paste, and can be formed by materials and methods well known in the art.

Figure 5:
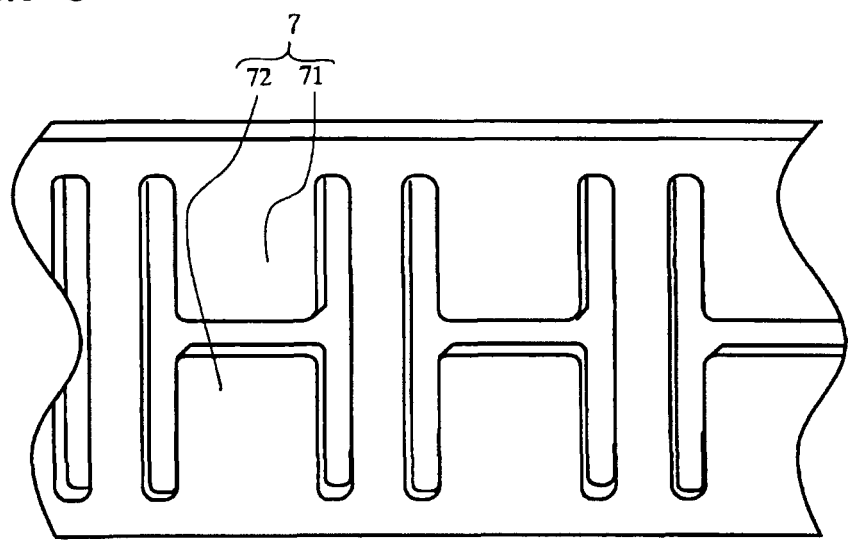
FIG. 5 is a fragmentary view of an assistance frame used in the present invention.
Figure 6:
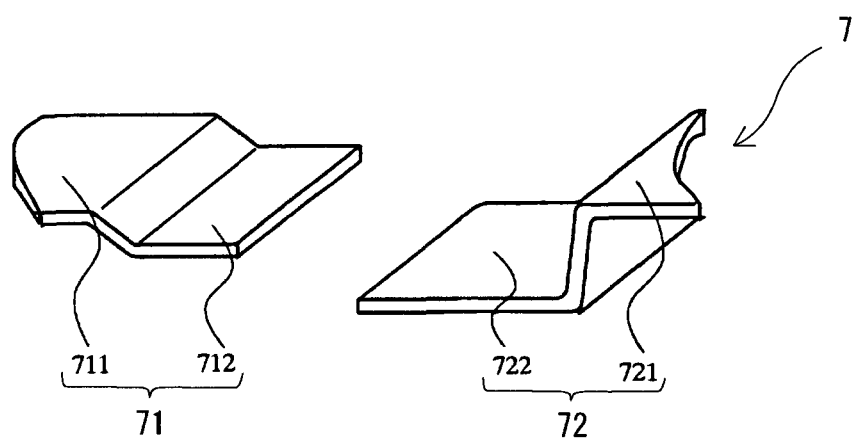
FIG. 6 is a drawing showing the processed assistance frame of the first and second embodiments of the present invention.

And then, an assistance frame 7 is processed. The assistance frame 7 is formed from, for example, a ladder-shaped frame formed from a metal member as shown in FIG. 5. The anode side assistance frame 71 and the cathode side assistance frame 72 of the assistance frame 7 are pressed for having a step part to have the structure shown in FIG. 6. By performing the press process for having a step part, an anode side first flat part 711, an anode side second flat part 712, a cathode side first flat part 721, and a cathode side second flat part 722 are formed. The anode side first flat part 711 and the cathode side first flat part 721 are generally parallel to the anode side second flat part 712 and the cathode side second flat part 722 respectively as shown in FIG. 6. It is possible to arbitrarily determine the distance between the anode side first flat part 711 and anode side second flat part 712, and the distance between the cathode side first flat part 721 and cathode side second flat part 722. However, it is preferable that the distance between the cathode side first flat part 721 and cathode side second flat part 722 is greater than the distance between the anode side first flat part 711 and anode side second flat part 712, since in the capacitor element 1 of the present invention, the anode lead-out part 21 is smaller than the cathode lead-out part 5 in the direction perpendicular to the direction in which the anode lead-out part 21 and the cathode lead-out part 5 of the capacitor element 1 of the present invention are arrayed.

Figure 7A:
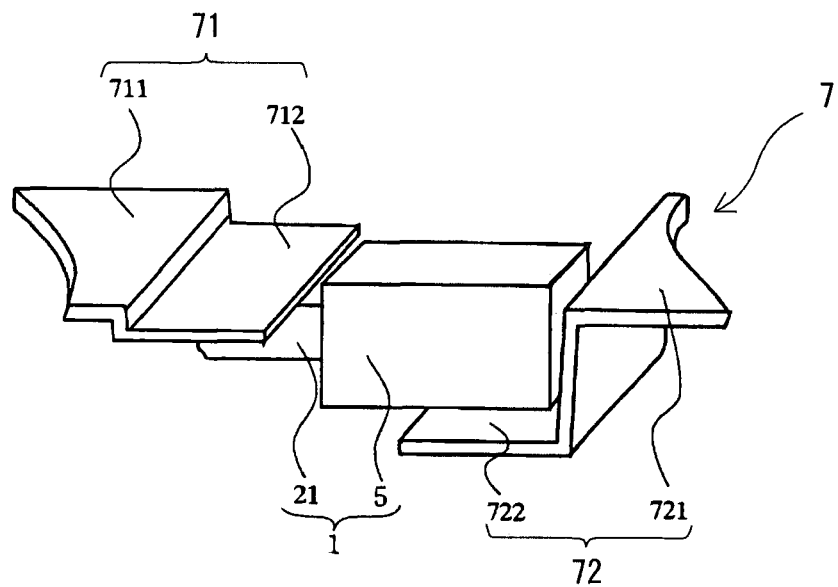
FIG. 7A is a perspective view of a capacitor element disposed on the assistance frame shown in FIG. 6 showing the relation between the capacitor element and the assistance frame.

And then, the capacitor element 1 is mounted on and connected to the assistance frame 7 as shown in FIG. 7A. The capacitor element 1 is mounted on the assistance frame 7 so that the cathode lead-out part 5 of the capacitor element 1 is located on the face of the cathode side second flat part 722 the closest to the cathode side first flat part 721, while the anode side second flat part 712 and the anode lead-out part 21 are in contact with each other on the face of the anode side second flat part 712, that is parallel to the face of the anode side first flat part 711 and located farther from the anode side first flat part 711. Thus the anode lead-out part 21 of the capacitor element 1 is connected to the anode side second flat part 712, while the cathode lead-out part 5 of the capacitor element 1 is connected to the cathode side second flat part 722. For the connection method, various methods well known in the art can be used. For example, resistance welding using the conductive paste, or laser welding can be used, and in addition, these methods can be combined.

By connecting the capacitor element 1 to the assistance frame 7 in the way described above, it is possible to ensure the connection between the capacitor element 1 and the assistance frame 7.

Figure 7B:
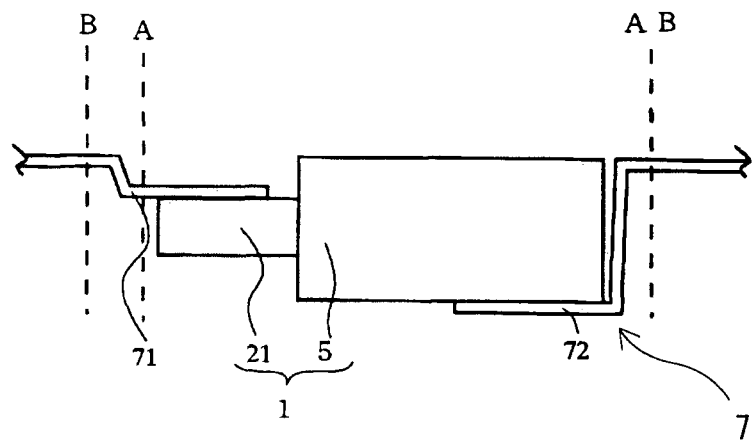
FIG. 7B is a cross-sectional view of the capacitor element disposed on the assistance frame shown in FIG. 6 showing the relation between the capacitor element and the assistance frame.
Figure 8A:
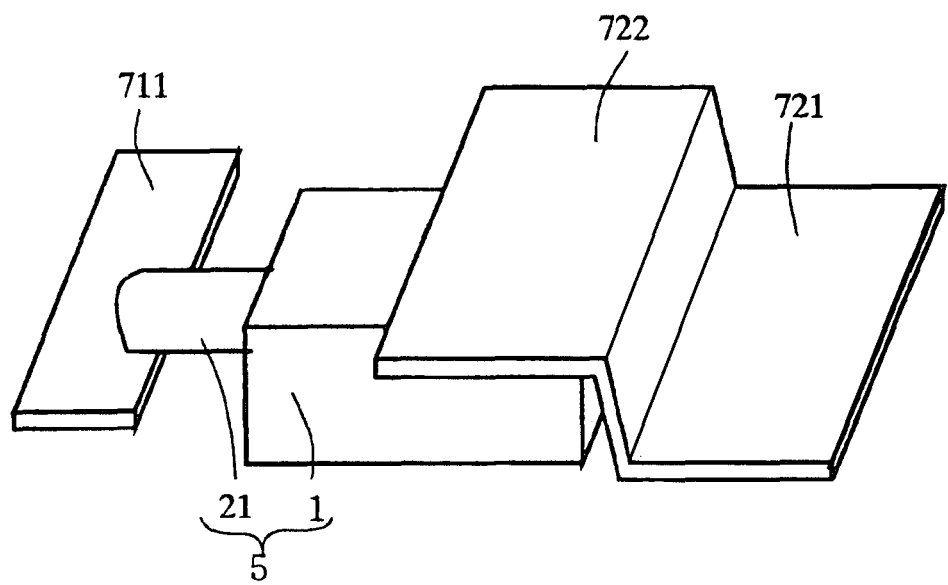
FIG. 8A is a perspective view showing the arrangement of the assistance frame and the capacitor element of the first embodiment of the present invention.
Figure 8B:
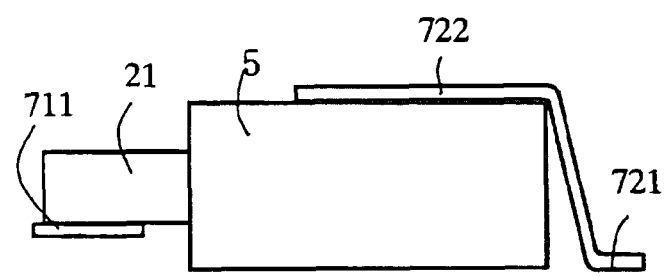
FIG. 8B is a cross-sectional view showing the arrangement of the assistance frame and the capacitor element of the first embodiment of the present invention.

After connecting the assistance frame 7 and the capacitor element 1 as described above, the assistance frame 7 is cut along the dash lines A shown in FIG. 7B, resulting in the structure shown upside down in the perspective view of FIG. 8A and front view of FIG. 8B.

Figure 9:
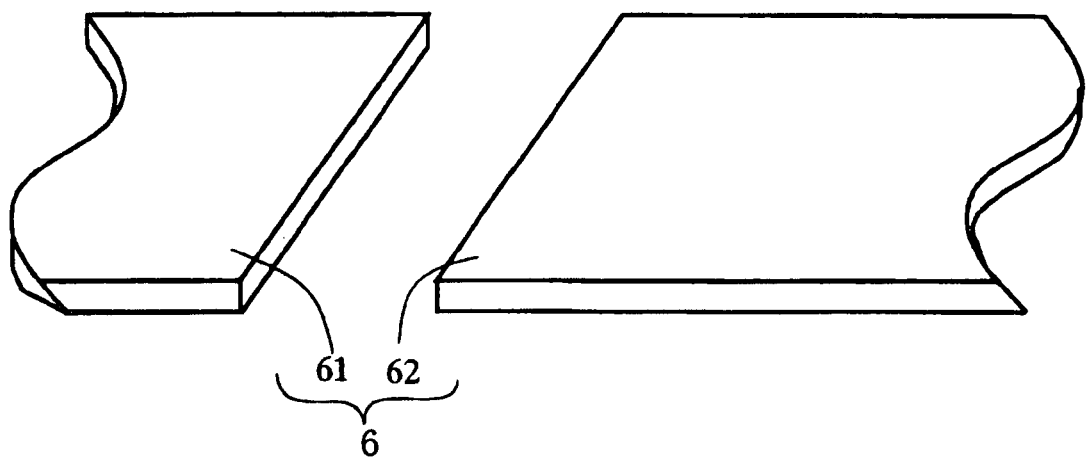
FIG. 9 is a perspective view of a lead frame of the present invention.
Figure 10:
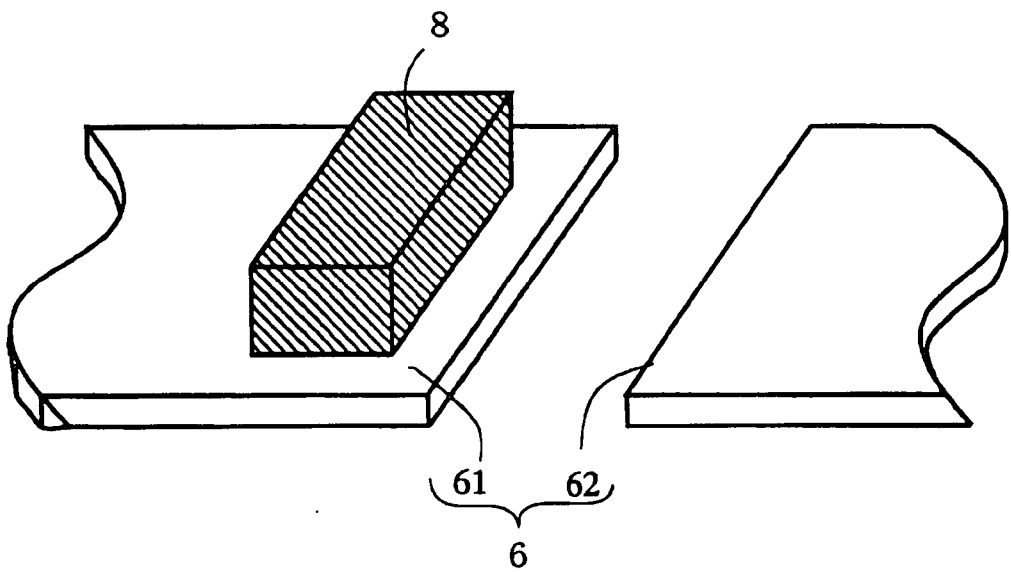
FIG. 10 is an arrangement plan of the lead frame and a conductive member of the first embodiment of the present invention.

Thereafter, a flat plate-like lead frame 6 as shown in the fragmentary view of FIG. 9 is prepared, and the conductive member 8 is mounted on and connected to the anode lead frame 61 of the lead frame 6 as shown in FIG. 10. The lead frame 6 is formed from a ladder-shaped frame consisting of metal member. For the lead frame 6 and the assistance frame 7, the same component can be used to contribute to the reduction in manufacturing cost.

Figure 11:
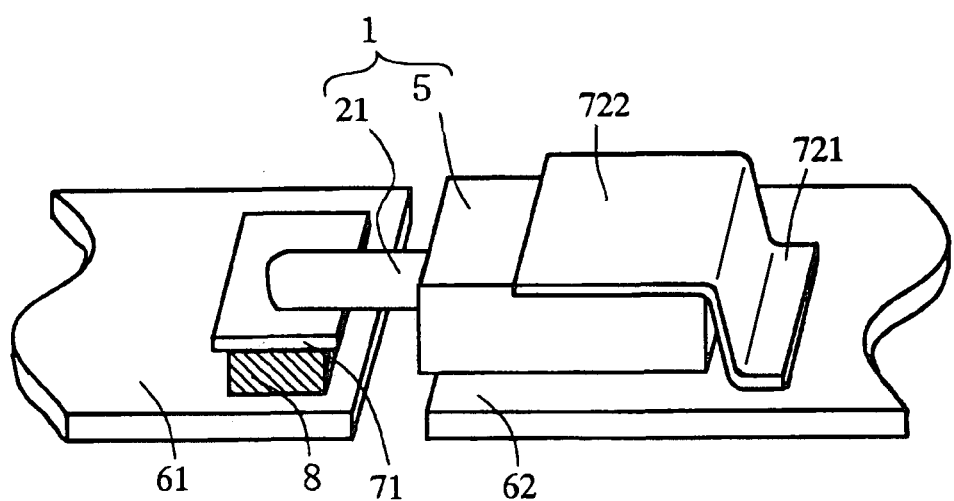
FIG. 11 is a drawing of the capacitor element shown in FIG. 8A mounted on the lead frame and conductive member shown in FIG. 10.

The capacitor element 1 of FIG. 8A is mounted on and connected to the lead frame 6 which has the anode lead frame 61 with the conductive member 8 connected thereto as shown in FIG. 10. In particular, as shown in FIG. 11, the capacitor element 1 is mounted on and connected to the lead frame 6 so that the anode side assistance frame 71 is in contact with the upper surface of the conductive member 8, while the cathode lead frame 62 is in contact with the surface of the cathode lead-out part 5 opposed to the surface thereof connected to the cathode side assistance frame 72. And then, when needed, the cathode side first flat part 721 of the cathode side assistance frame 72 is pushed to move toward the cathode lead frame 62, so that the cathode side first flat part 721 of the cathode side assistance frame 72 and the cathode lead frame 62 are in surface contact with and connected to each other. The connections described above are conducted using the techniques well known in the art.

In the state where the capacitor element 1 is connected to the assistance frame 7 and the lead frame 6 as described above, the capacitor element 1 is covered with the exterior resin 9 so as to expose the surface of the anode lead frame 61 opposed to the surface thereof connected to the conductive member 8 and the surface of the cathode lead frame 62 opposed to the surface thereof connected to the conductive member 8 and cathode lead-out part 5. And then, the anode lead frame 61 and the cathode lead frame 62 are cut at a predetermined position to form the solid electrolytic capacitor shown in FIGS. 1A and 1B.

Embodiment 2

Figure 2A:
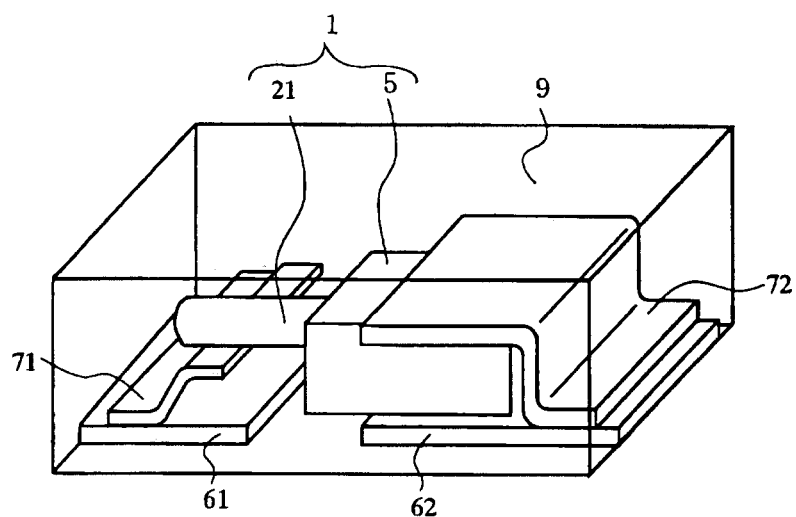
FIG. 2A is a perspective view of a solid electrolytic capacitor of the second embodiment of the present invention.
Figure 2B:
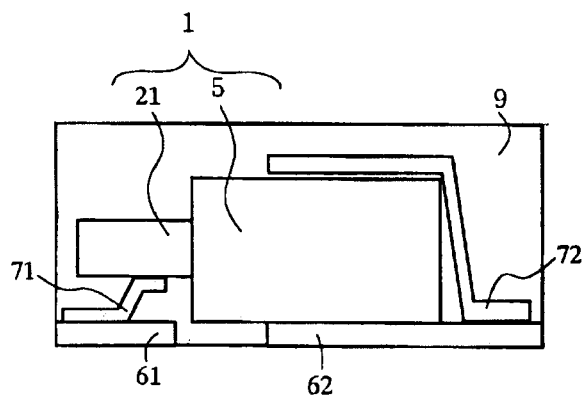
FIG. 2B is a cross-sectional view of the solid electrolytic capacitor of the second embodiment of the present invention.

FIGS. 2A and 2B are a perspective view and a cross-sectional view of a solid electrolytic capacitor of the second embodiment of the present invention respectively. This solid electrolytic capacitor comprises a capacitor element 1 including an anode lead-out part 21 and a cathode lead-out part 5, an anode side assistance frame 71 connected to the anode lead-out part 21, a cathode side assistance frame 72 connected to the cathode lead-out part 5, an anode lead frame 61 connected to the anode side assistance frame 71, a cathode lead frame 62 connected to the cathode lead-out part 5 and the cathode side assistance frame 72, and an exterior resin 9. The anode side assistance frame 71 has a step part in the direction in which the anode lead-out part 21 and the cathode lead-out part 5 are arrayed, and two flat parts parallel to each other on both sides across the step part. One of the flat parts is connected to the anode lead-out part 21, while the other is connected to the anode lead frame 61. Also, the cathode side assistance frame 72 has a step part in the direction in which the anode lead-out part 21 and the cathode lead-out part 5 are arrayed, and two flat parts parallel to each other on both sides across the step part. One of the flat parts is connected to the cathode lead-out part 5, while the other is connected to the cathode lead frame 62. The cathode lead frame 62 is also connected to the cathode lead-out part 5 on the face thereof on which the cathode lead frame 62 is connected to the cathode side assistance frame 72.

Due to the structure described above, the capacitor element 1 is reliably connected to the anode lead frame 61 and cathode lead frame 62 to prevent generation of defective units due to bad connection, thereby improving the yield rate. Also, the connections are strong and the connection area between the capacitor element 1 and the assistance frame as well as the lead frame increases to thereby reduce the ESR of the solid electrolytic capacitor. Further, contrary to the structure of the first embodiment, the conductive member 8 is not required. Therefore, it is possible to reduce the material cost and to omit the process of connecting the conductive member 8 to the anode lead frame 61, thereby realizing the reduction in manufacturing cost and simplifying the manufacturing process.

Figure 12A:
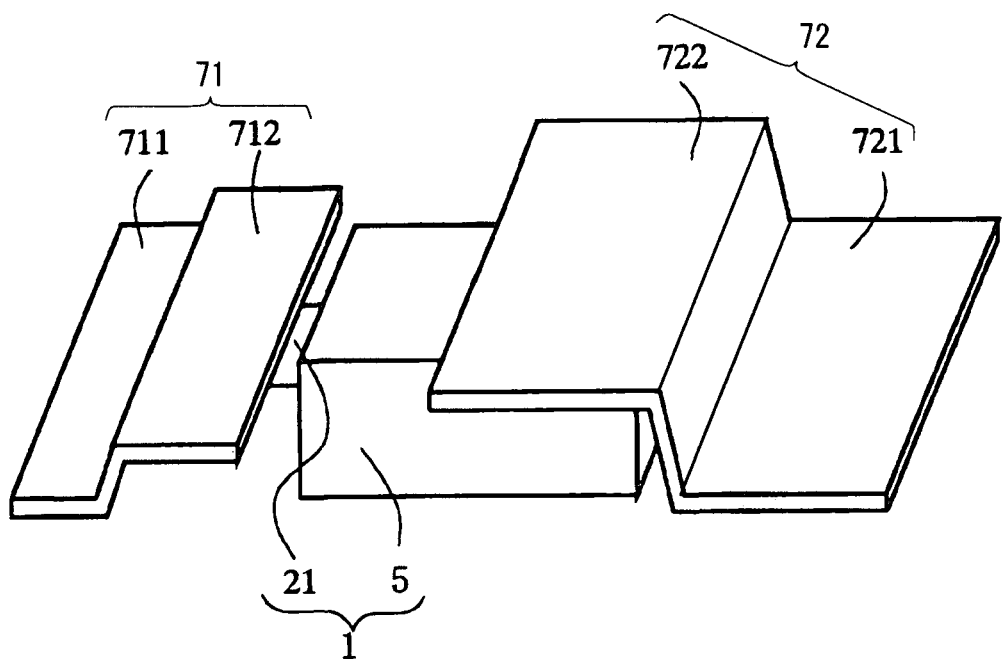
FIG. 12A is a perspective view showing the arrangement of the assistance frame and the capacitor element of the second embodiment of the present invention.
Figure 12B:
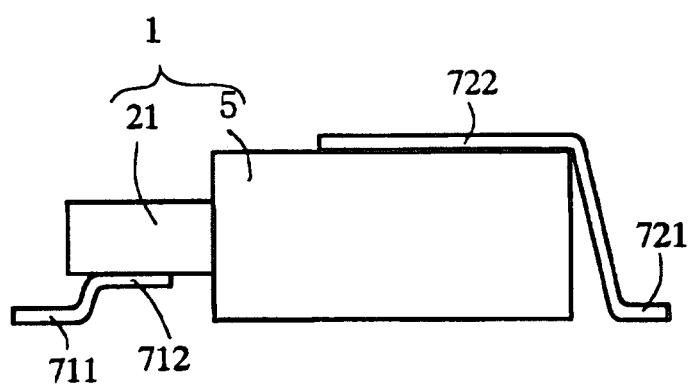
FIG. 12B is a cross-sectional view showing the arrangement of the assistance frame and the capacitor element of the second embodiment of the present invention.
Figure 13:
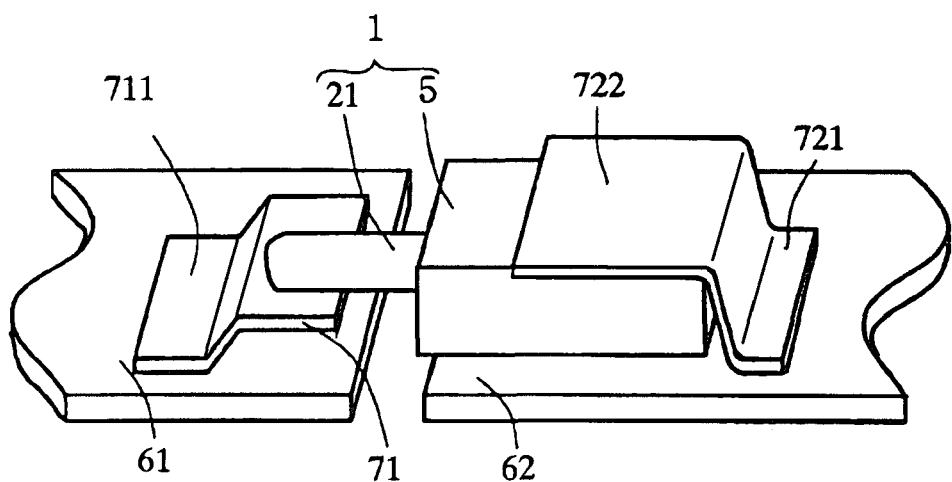
FIG. 13 is a drawing of the capacitor element shown in FIG. 12A mounted on the lead frame shown in FIG. 9.

The solid electrolytic capacitor shown in FIGS. 2A and 2B can be formed as to be described below. The capacitor element 1 can be made by the same method as used to form the capacitor element 1 of the first embodiment. As well as in the first embodiment, an assistance frame 7 of FIG. 5 is subject to a press process for having a step part to have the structure shown in FIG. 6. The capacitor element 1 is mounted on and connected to the assistance frame 7 as shown in FIGS. 7A and 7B in the same manner as described in the first embodiment. And then, the capacitor element 1 mounted on and connected to the assistance frame 7 is cut along dash lines B shown in FIG. 7B to obtain the structure shown in FIGS. 12A and 12B upside down. Thereafter, the capacitor element 1 shown in FIG. 12A is mounted on the lead frame 6 having the anode lead frame 61 and cathode lead frame 62 shown in FIG. 9 to obtain the structure shown in FIG. 13. In particular, when needed, the anode side first flat part 711 of the anode side assistance frame 71 is pushed to move toward the anode lead frame 61 so that the anode side first flat part 711 and the anode lead frame 61 are in surface contact with and connected to each other. And then the cathode lead-out part 5 of the capacitor element 1 is connected to the cathode lead frame 62. Thereafter, when needed, the cathode side first flat part 721 of the cathode side assistance frame 72 is pushed to move toward the cathode lead frame 62 so that the cathode side first flat part 721 and the cathode lead frame 62 are in surface contact with and connected to each other.

In the solid electrolytic capacitor formed in the way described above, even when the thickness of the capacitor element 1 varies between individual capacitor elements, the capacitor element 1 is reliably connected to the anode lead frame 61 and the cathode lead frame 62 respectively, and therefore, it is possible to prevent generation of defective units due to bad connection to improve the yield rate. Also, the connection area between the capacitor element 1 and the assistance frame 7 as well as the lead frame 6 increases to thereby reduce the ESR of the solid electrolytic capacitor. Further, even in forming a solid electrolytic capacitor of different size, it is possible to obtain the structure of the anode side assistance frame 71 of the second embodiment by only changing the strength of pressing to have a step part, thereby realizing effective manufacture without changing the manufacturing equipment.

The capacitor element 1 is mounted on and connected to the lead frame 6 as described above, and then covered with the exterior resin 9 and cut at an appropriate position in the same way as in the first embodiment to be made into the solid electrolytic capacitor shown in FIGS. 2A and 2B.

Embodiment 3

Figure 3A:
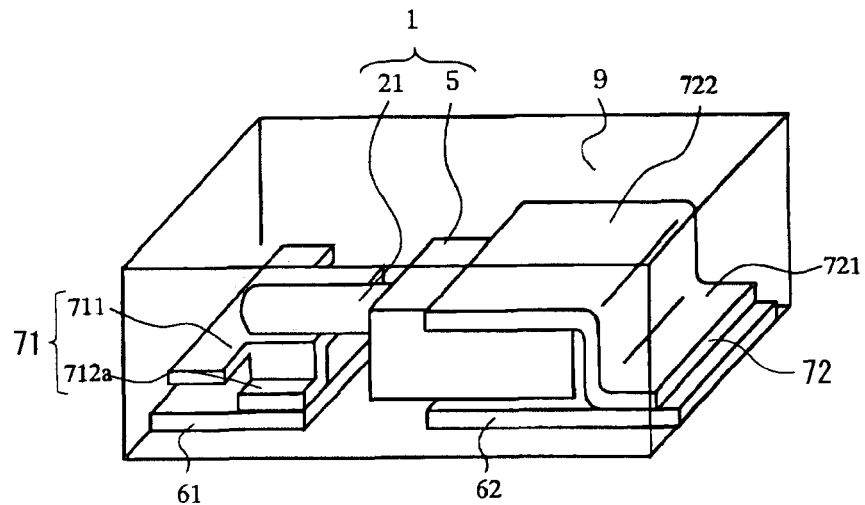
FIG. 3A is a perspective view of a solid electrolytic capacitor of the third embodiment of the present invention.
Figure 3B:
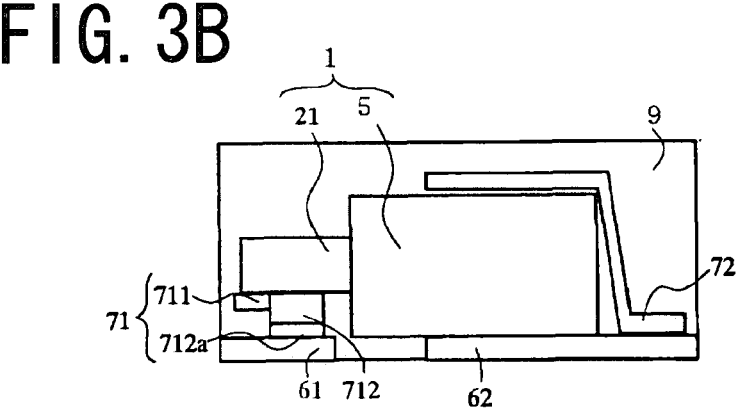
FIG. 3B is a cross-sectional view of the solid electrolytic capacitor of the third embodiment of the present invention.

FIGS. 3A and 3B are a perspective view and a cross-sectional view of a solid electrolytic capacitor of the third embodiment of the present invention respectively. This solid electrolytic capacitor comprises a capacitor element 1 including an anode lead-out part 21 and a cathode lead-out part 5, an anode side assistance frame 71 and cathode side assistance frame 72 connected to the anode lead-out part 21 and cathode lead-out part 5 respectively, an anode lead frame 61 and cathode lead frame 62 connected to the anode side assistance frame 71 and cathode side assistance frame 72 respectively, and an exterior resin 9. The anode side assistance frame 71 is connected to the anode lead frame 61 by extending both end parts of a face thereof opposed to the cathode lead-out part 5 from the anode lead-out part 21 toward the anode lead frame 61. The connecting surface between the cathode side assistance frame 72 and cathode lead frame 62 and the connecting surface between the cathode lead-out part 5 and cathode lead frame 62 are on the same face of the cathode lead frame 62, while the cathode side assistance frame 72 and the cathode lead-out part 5 are connected to each other on a face of the cathode lead-out part 5 opposed to the connecting surface with the cathode lead frame 62.

Due to the structure described above, the capacitor element 1 is reliably connected to the anode lead frame 61 and the cathode lead frame 62 to prevent generation of defective units, thereby improving the yield rate. Also, the connection area between the capacitor element 1 and the assistance frame 7 as well as the lead frame 6 increases to thereby reduce the ESR of the solid electrolytic capacitor.

Figure 14:
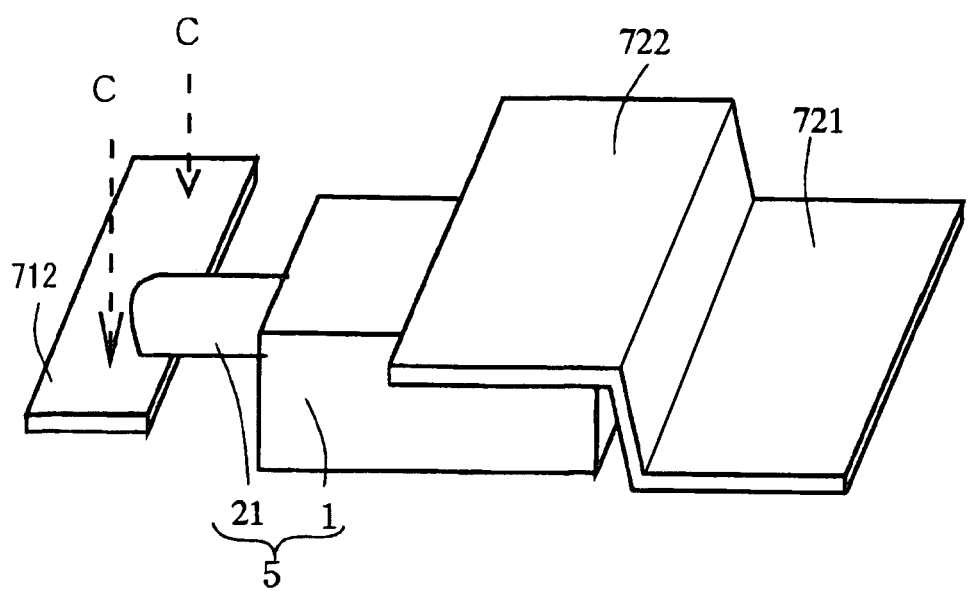
FIG. 14 is an arrangement plan of the assistance frame and the capacitor element of the third embodiment of the present invention when the assistance frame is cut.
Figure 15A:
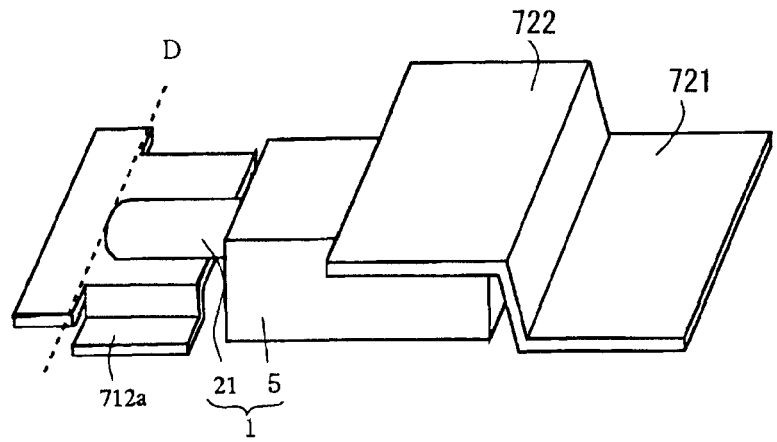
FIG. 15A is a perspective view showing the arrangement of the assistance frame and the capacitor element of the third embodiment of the present invention.
Figure 15B:
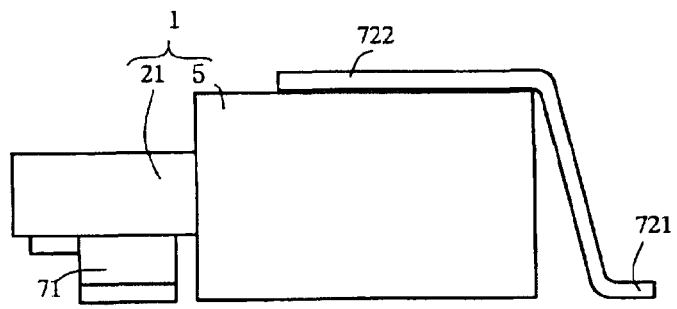
FIG. 15B is a cross-sectional view showing the arrangement of the assistance frame and the capacitor element of the third embodiment of the present invention.
Figure 16:
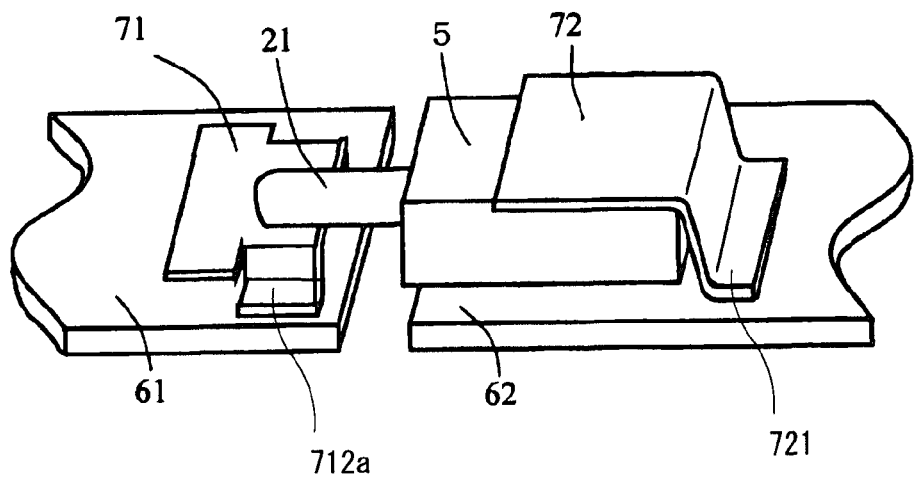
FIG. 16 is a drawing of the capacitor element shown in FIG. 15A mounted on the lead frame shown in FIG. 9.
Figure 17:
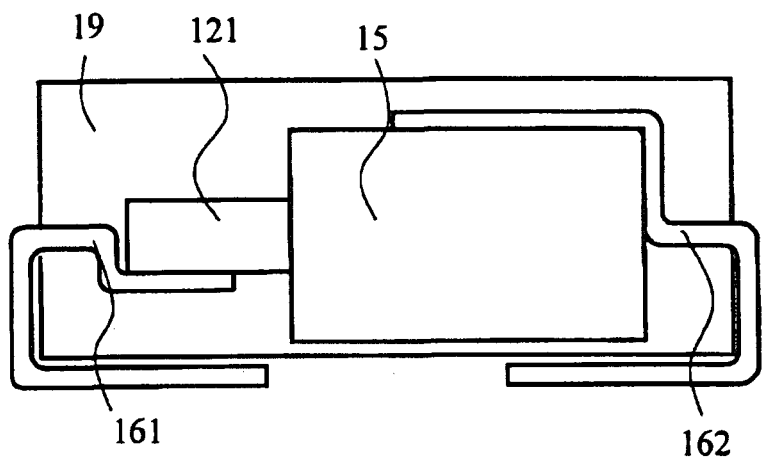
FIG. 17 is a cross-sectional view of a conventional solid electrolytic capacitor.
Figure 18:
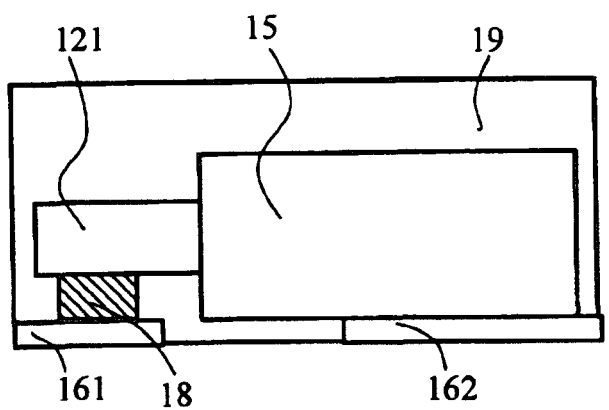
FIG. 18 is a cross-sectional view of a conventional solid electrolytic capacitor having another arrangement.

The solid electrolytic capacitor shown in FIGS. 3A and 3B can be formed as to be described below. First, the capacitor element 1 is formed. The capacitor element 1 has a structure shown in FIG. 4, and can be formed in the same way as in the first embodiment. And then the flat plate-like shaped lead frame 6 formed from a ladder-shaped frame as shown in FIG. 5 is subjected to press process for having a step part to have the structure shown in FIG. 6, and is cut along the dash lines A of FIG. 7B, resulting in obtaining the structure shown in FIG. 14 upside down. Thereafter, a part of the anode side second flat part 712 is pressed down in the direction of dashed arrows C to form a connection part 712a as shown in FIGS. 15A and 15B. And then, as shown in FIG. 16, the capacitor element 1 is mounted on the flat plate-like anode lead frame 61 and cathode lead frame 62 shown in FIG. 9. When needed, the connection part 712a is further pressed down so that the connection part 712a and anode lead frame 61 are in surface contact with and connected to each other. Here, the connection part 712a can be formed either before the capacitor element 1 is mounted on the anode lead frame 61 as described above, or after the capacitor element 1 is mounted on the anode lead frame 61 and before connected thereto. The capacitor element 1 is mounted on and connected to the anode lead frame 61 and cathode lead frame 62 so that the cathode lead-out part 5 is located on the cathode lead frame 62. When needed, the first flat part 721 of the cathode side assistance frame 72 is pressed down toward the cathode lead frame 62 so that the cathode side first flat part 721 comes into surface contact with the cathode lead frame 62 to connect the cathode side assistance frame 72 to the cathode lead frame 62.

After the capacitor element 1 is connected to the lead frame 6 in the way described above, the capacitor element 1 is covered with the exterior resin 9, and the lead frame 6 is cut at an appropriate position to form the solid electrolytic capacitor shown in FIGS. 3A and 3B.

In the solid electrolytic capacitor formed in the way described above, since the capacitor element 1 is reliably connected to the anode lead frame 61 and the cathode lead frame 62, generation of defective units due to bad connection is prevented to improve the yield rate. Also, since the connections are strong between the capacitor element 1 and the assistance frame 7 as well as the lead frame 6, it is possible to reduce the ESR of the solid electrolytic capacitor.

Here, the press process for having a step part performed on the anode side second flat part 712 in the third embodiment can be performed over the entire length of the anode side second flat part 712 in the direction in which the anode lead frame 61 and the cathode lead frame 62 are arrayed. In such a case, in the third embodiment, the shape of the anode side assistance frame 71 connected to the anode lead-out part 21 is the shape shown in FIG. 15A with the end part cut along the dash line D of the figure.

The embodiments described above are intended to illustrate the present invention, and should not be construed as limiting the invention set forth in the appended claims. For example, in the present invention, an anode body formed from valve action metal is used as the anode body of the capacitor element, however, foil formed from a valve action metal such as aluminum foil can also be used, or the capacitor element can be stacked. The present invention is suitably changeable within the range of claims and equivalents.

What is claimed is:

1. A solid electrolytic capacitor comprising:
    a capacitor element including an anode lead-out part and a cathode lead-out part, the cathode lead-out part having a first outer surface and a second outer surface opposite to the first outer surface;
    an anode lead frame connected to the anode lead-out part;
    a cathode lead frame being entirely a flat piece member and having a first surface and a second surface opposite to the first surface, the first surface being connected to the second outer surface of the cathode lead-out part;
    a cathode side assistance frame connected to the first outer surface of the cathode lead-out part and the first surface of the cathode lead frame; and
    a resin covering the capacitor element, the anode lead frame, the cathode lead frame, and the cathode side assistance frame,
    wherein the cathode side assistance frame is bent in a step-like configuration,
    wherein the cathode side assistance frame has a cathode side first flat part, a cathode side second flat part, and a step part provided between the cathode side first and second flat parts, the step part extending from a level of the first outer surface to a level of the second outer surface,
    wherein the cathode side first flat part is connected to a region of the first surface of the cathode lead frame that is different from a region of the first surface of the cathode lead frame connected to the second outer surface of the cathode lead-out part,
    wherein the cathode side second flat part is connected to the first outer surface of the cathode lead-out part,
    wherein the cathode lead-out part further has a third outer surface facing the step part, the step part inclining so as to make a clearance between the step part and the third outer surface gradually larger from the level of the first outer surface to the level of the second outer surface, and
    wherein the second surface of the cathode lead frame is exposed from the resin.

2. The solid electrolytic capacitor according to claim 1, wherein the cathode side assistance frame and the cathode lead frame are connected via a conductive paste.

3. The solid electrolytic capacitor according to claim 1, wherein the step part has a part spaced from the third outer surface.

* * * * *